US011613233B2

(12) United States Patent
Srinivas et al.

(10) Patent No.: US 11,613,233 B2
(45) Date of Patent: Mar. 28, 2023

(54) WINDSHIELD WIPER SYSTEM WITH AN INTERNAL TRIGGER

(71) Applicant: Rosemount Aerospace Inc., Burnsville, MN (US)

(72) Inventors: Nouduri Phani Srinivas, Bangalore (IN); Aruna Manjunath, Mysore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/484,334

(22) Filed: Sep. 24, 2021

(65) Prior Publication Data

US 2022/0234542 A1  Jul. 28, 2022

(30) Foreign Application Priority Data

Jan. 25, 2021  (IN) .............................. 202141003431

(51) Int. Cl.
  *B60S 1/08*  (2006.01)
  *B60S 1/26*  (2006.01)
(52) U.S. Cl.
  CPC .............. *B60S 1/0822* (2013.01); *B60S 1/08* (2013.01); *B60S 1/26* (2013.01)
(58) Field of Classification Search
  CPC .... H02K 7/1166; H02K 11/38; H02K 11/215; B60S 1/08; B60S 1/0822

USPC ............ 15/250.001; 318/286, 443, 283, 444, 318/282, 280
See application file for complete search history.

(56) References Cited

U.S. PATENT DOCUMENTS

| 5,404,085 | A | 4/1995 | Resch et al. |
| 5,479,077 | A | 12/1995 | Kline et al. |
| 6,944,906 | B2 | 9/2005 | Moein et al. |
| 7,256,565 | B2 | 8/2007 | Merkel et al. |
| 7,586,275 | B2 * | 9/2009 | Amagasa .................. B60S 1/08 318/443 |
| 10,336,300 | B2 | 7/2019 | Ijima |
| 2019/0337488 | A1 | 11/2019 | Thirunarayana et al. |
| 2021/0016746 | A1 | 1/2021 | Bojjanapalli et al. |

OTHER PUBLICATIONS

Extended European Search Report for EP Application No. 22152516.5, dated Jun. 14, 2022, pp. 7.

* cited by examiner

*Primary Examiner* — Katina N. Henson
(74) *Attorney, Agent, or Firm* — Kinney & Lange, P. A.

(57) ABSTRACT

An aircraft windshield wiper system includes a wiper arm, a wiper blade coupled to a first end of the wiper arm, and an output shaft coupled to a second end of the wiper arm. The wiper blade is configured to clean water, dirt, and other debris from the windshield of the aircraft. The output shaft is configured to rotate and cause the wiper arm with the coupled wiper blade to sweep across and clean the windshield. A sensor and a trigger are coupled to an actuator to ensure accurate sweep angle and parking position of the wiper arm and wiper blade.

17 Claims, 4 Drawing Sheets

WINDSHIELD WIPER SYSTEM WITH AN INTERNAL TRIGGER

BACKGROUND

The present disclosure relates to windshield wiper systems, and in particular to a windshield wiper system used on an aircraft.

Aircraft windshield wiper systems are used to wipe and clean water or other debris from an aircraft windshield, allowing better visibility out the windshield for both the pilot and co-pilot. Traditionally, the rotation, sweep limits, and parking positions of the wipers are achieved by controlling the angular position of the wiper output shaft which is attached to an end of each wiper of the windshield wiper system. Software is used to control the angular position of the wiper output shaft through an actuator. The accuracy of the sweep angle and parking positioned depends on how precisely the wipers are assembled to the actuator and how precisely the wiper system is installed on an aircraft. Therefore, the theoretical position of the wiper blade may not represent the actual position of the wiper blade due to improper installation of components, degradation of components, and/or external forces causing the actual position of the wiper blade to vary from the theoretical position.

SUMMARY

According to one aspect of the disclosure, a windshield wiper system for use on a windshield of an aircraft is disclosed. The windshield wiper system includes a wiper, an actuator, a trigger, and a sensor. The wiper includes a wiper arm and a wiper blade coupled to a first end of the wiper arm. The actuator includes a body and an output shaft, the output shaft is coupled to a second end of the wiper arm, and the actuator is configured to rotate the output shaft to sweep the wiper arm and wiper blade in an arc across the windshield of the aircraft. The trigger is coupled to the output shaft of the actuator, and the trigger is configured to rotate with the output shaft. The sensor is coupled to the body of the actuator, and the sensor is configured to detect a magnetic field produced by the trigger.

According to another aspect of the invention, a method of operating a windshield wiper system for use on a windshield of an aircraft is disclosed. The method includes transferring, by a controller, a command signal to an electrically coupled actuator to control rotation of an output shaft of the actuator. Rotating, by the actuator, the output shaft in an oscillatory motion. Detecting, by a sensor, a magnetic field produced by a trigger coupled to the rotating output shaft. Transferring, by the sensor, a feedback signal to the electrically coupled controller indicating the magnitude of the magnetic field detected by the sensor. The magnitude of the magnetic field is indicative of a position of a wiper arm and a wiper blade coupled to the output shaft.

DETAILED DESCRIPTION

Figure 1A:
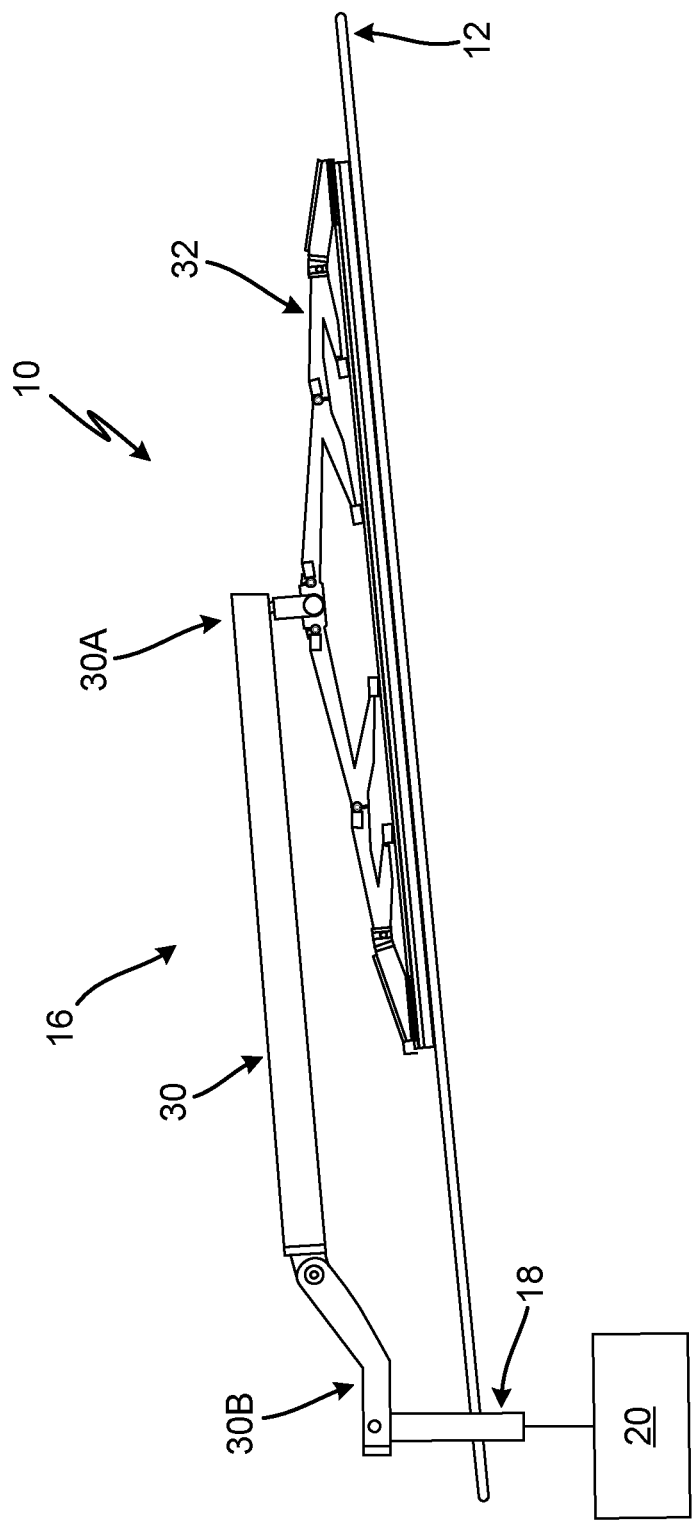
FIG. 1A is a side view of a windshield wiper system on an aircraft windshield.
Figure 1B:
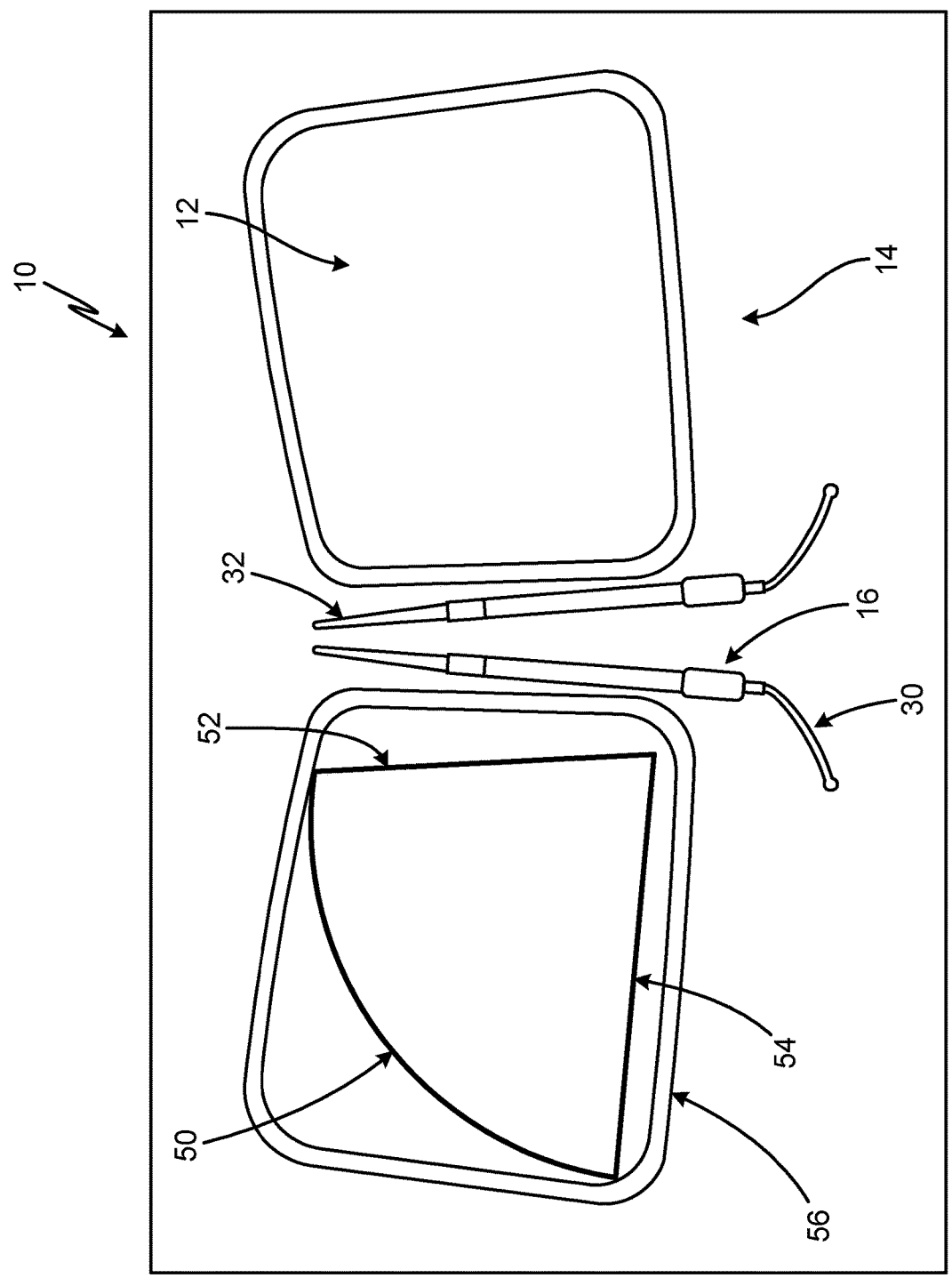
FIG. 1B is a front view of the windshield wiper system on an aircraft windshield.
Figure 1C:
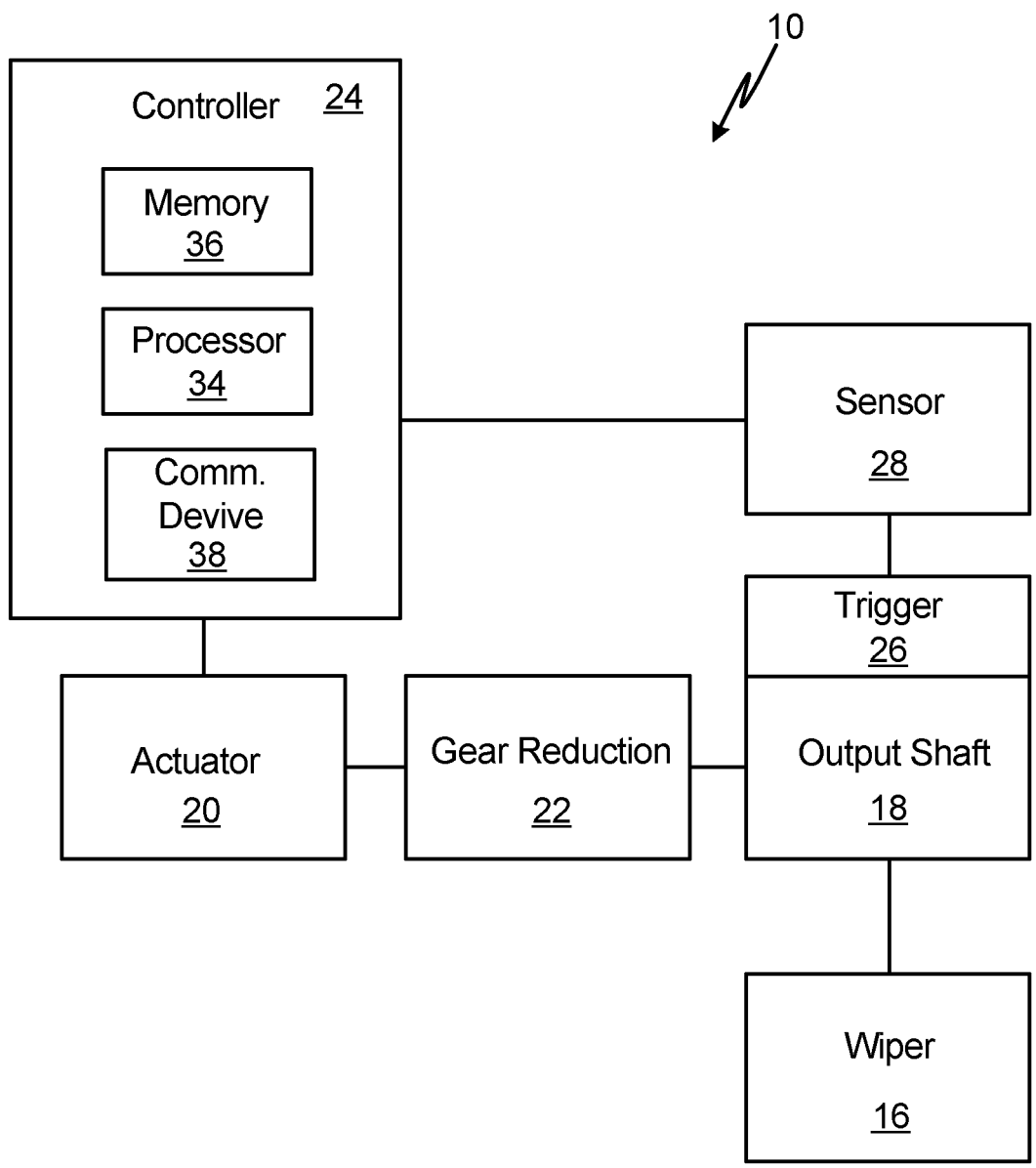
FIG. 1C is a schematic block diagram of the windshield wiper system.

FIG. 1A is a side view of windshield wiper system 10 on windshield 12 of aircraft 14 (FIG. 1B). FIG. 1B is a front view of windshield wiper system 10 on windshield 12 of aircraft 14. FIG. 1C is a schematic block diagram of windshield wiper system 10. FIGS. 1A-1C will be discussed together. Further, hereinafter windshield wiper system 10 will be referred to as WWS 10. WWS 10 includes wiper 16, output shaft 18, actuator 20, gear reduction 22, controller 24, trigger 26, and sensor 28. WWS 10 is installed on windshield 12 of aircraft 14 and WWS 10 is configured to clear windshield 12 of rain or other debris.

Wiper 16 includes wiper arm 30 and wiper blade 32. Wiper arm 30 includes first end 30A positioned at a distal end of wiper arm 30 and second end 30B positioned at an opposite distal end of wiper 16 as first end 30A. Wiper blade 32 is coupled to first end 30A of wiper arm 30 through a standard connection, such as a threaded or clamping connection. Wiper arm 30 and wiper blade 32 can each be constructed from a polymer, a metal, or partially from a polymer and partially from a metal. Wiper arm 30 is coupled to output shaft 18 at second end 30B of wiper arm 30 through a standard connection, such as a threaded or clamping connection. Output shaft 18 extends through a body portion of aircraft 14 adjacent windshield 12, but not through windshield 12. Output shaft 18 is configured to rotate about its central axis, providing rotational energy to second end 30B of wiper arm 30, which in turn forces wiper 16 to traverse across windshield 12 in a sweeping motion.

Actuator 20 is coupled to output shaft 18 within the body portion of aircraft 14. Actuator 20 is configured to provide rotational energy to output shaft 18, rotating output shaft 18 about its central axis. The rotation of output shaft 18 forces wiper 16 to traverse across windshield 12 in a sweeping motion, therefore actuator 20 provides the energy necessary to drive motion of wiper 16. In the embodiment shown, actuator 20 is a brushless direct current motor. In another embodiment, actuator 20 can be a brushed direct current motor or any other motor configured to provide rotational energy to output shaft 18. Further, actuator 20 is a bi-directional motor that can operate in both directions, allowing output shaft 18, wiper arm 30, and wiper blade 32 to travel across windshield 12 in both directions. Actuator 20 is coupled to output shaft 18 through gear reduction 22, in which gear reduction 22 is positioned between output shaft 18 and actuator 20. In other words, gear reduction 22 is positioned within the body of aircraft 14, coupled at one end to output shaft 18, and coupled at the other end to actuator 20. Gear reduction 22 has a large gear ratio (greater than 3:1), meaning that many rotations of actuator 20 causes only a few degrees of rotation of wiper 16. Gear reduction 22 is configured to provide precise angular rotation of wiper 16. In the embodiment shown in FIG. 1C, output shaft 18, actuator 20, and gear reduction 22 are shown as separate components. In another embodiment, gear reduction 22 can be integral with actuator 20 such that actuator 20, gear reduction 22, and output shaft 18 are a single assembly.

In the example shown, controller 24 includes processor(s) 34, memory 36, and communication device(s) 38. However, in certain examples, controller 24 can include more or fewer components than components 34, 36, and 38. Processor(s) 34, in one example, are configured to implement functionality and/or process instructions for execution within controller 24. For instance, processor(s) 34 can be capable of processing instructions stored in memory 36. Examples of processor(s) 34 can include any one or more of a microprocessor, a digital signal processor (DSP), an application specific integrated circuit (ASIC), a field-programmable gate array (FPGA), or other equivalent discrete or integrated logic circuitry.

Memory 36 can be configured to store information within controller 24 during operation of WWS 10. Memory 36, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 36 is a temporary memory, meaning that a primary purpose of memory 36 is not long-term storage. Memory 36, in some examples, is described as volatile memory, meaning that memory 36 does not maintain stored contents when power to controller 24 is turned off. Examples of volatile memories can include random access memories (RAM), dynamic random-access memories (DRAM), static random-access memories (SRAM), and other forms of volatile memories. In some examples, memory 36 is used to store program instructions for execution by processor(s) 34. Memory 36, in one example, is used by software or applications running on controller 24 (e.g., a software program implementing a system architecture) to temporarily store information during program execution. Memory 36, in some examples, also includes one or more computer-readable storage media. Memory 36 can be configured to store larger amounts of information than volatile memory. Memory 36 can further be configured for long-term storage of information. In some examples, memory 36 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 24, in some examples, also includes communication device(s) 38. Controller 24, in one example, utilizes communication device(s) 38 to communicate with external devices via one or more networks, such as one or more wireless or wired networks or both. Communication device(s) 38 can be a network interface card, such as an Ethernet card, an optical transceiver, a radio frequency transceiver, or any other type of device that can send and receive information. Other examples of such network interfaces can include Bluetooth, 3G, 4G, 5G, and Wi-Fi radio computing devices as well as Universal Serial Bus (USB).

Controller 24 is positioned within the body portion of aircraft 14 and controller 24 is electrically coupled to actuator 20 and electrically coupled to sensor 28. Controller 24 can be electrically coupled to each component through electrical wires or a wireless connection to send and receive signals from actuator 20 and sensor 28. More specifically, controller 24 is electrically coupled to actuator 20 through a wired or wireless connection and controller 24 is configured to send signals to actuator 20 to control operation of actuator 20. As such, controller 24 can send electrical signals to and receive electrical signals from actuator 20 to control rotation of output shaft 18 of actuator 20. Controller 24 is also electrically coupled to sensor 28 through a wired or wireless connection and controller 24 is configured to send signals to and receive signals from sensor 28, discussed in detail below.

Figure 2A:
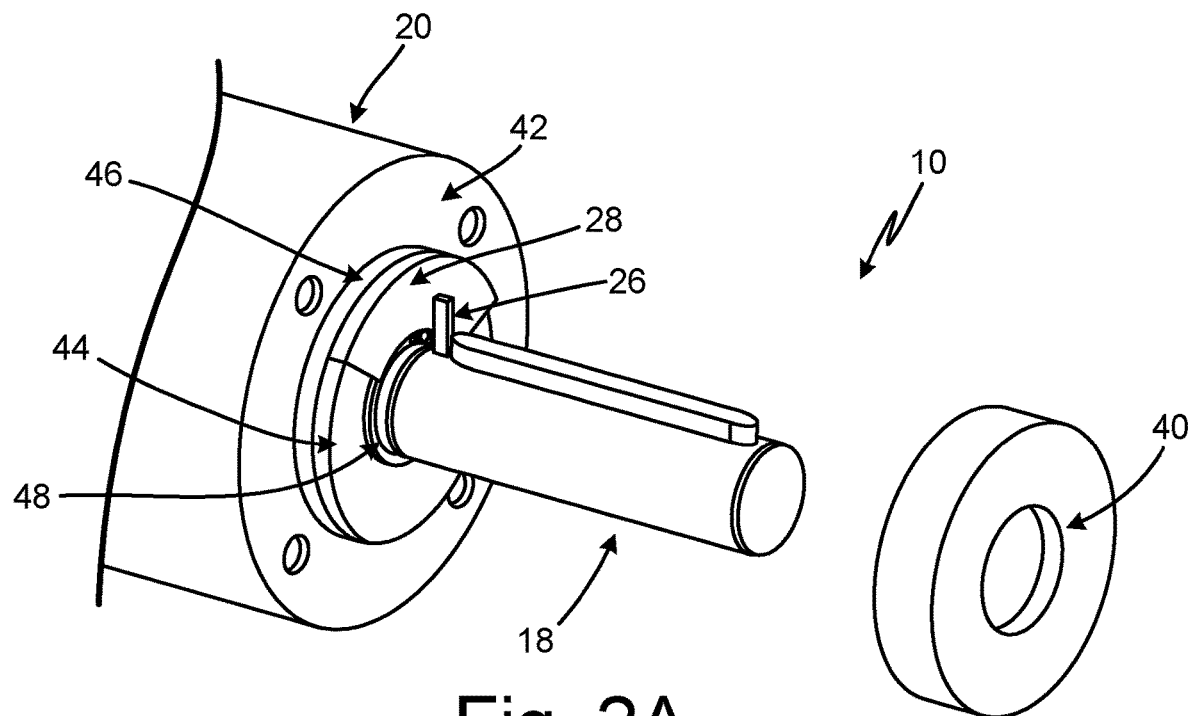
FIG. 2A is an exploded perspective view of an actuator of the windshield wiper system.
Figure 2B:
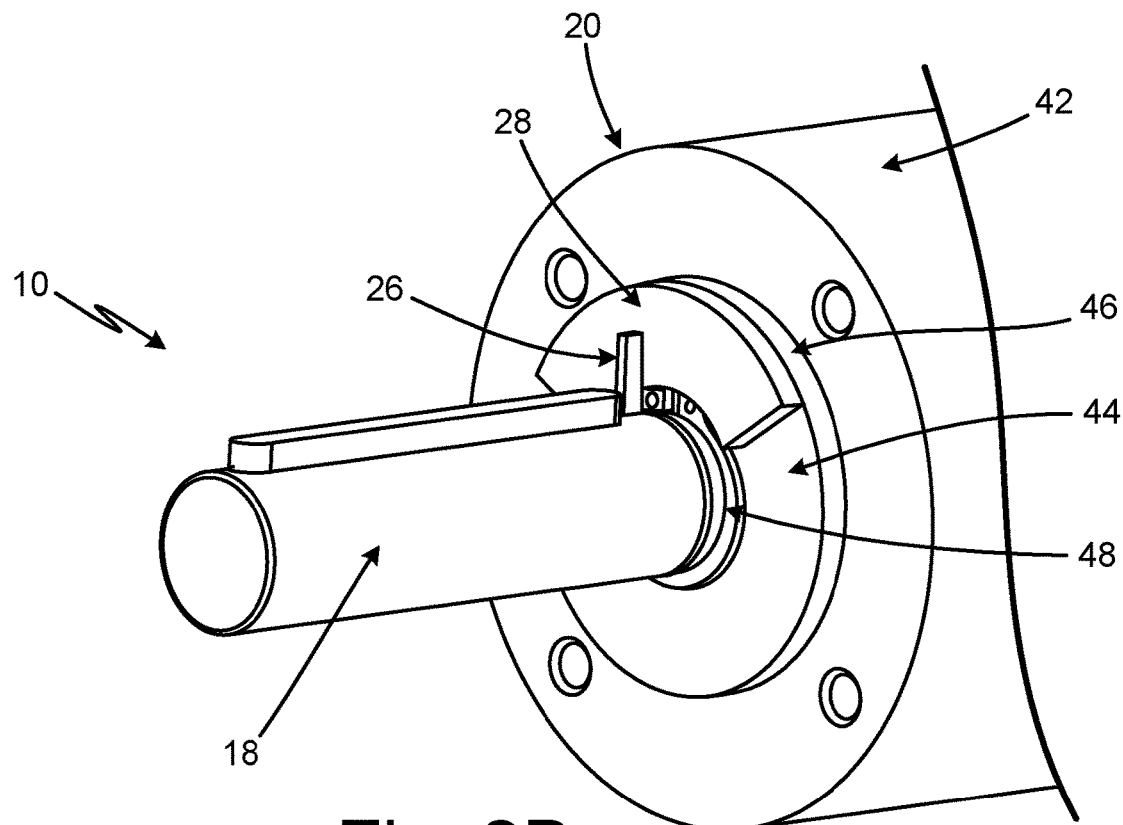
FIG. 2B is a close-up perspective view of the actuator of FIG. 2A.

FIG. 2A is an exploded perspective view of actuator 20, trigger 26, sensor 28, and housing 40 of WWS 10. FIG. 2B is a close-up perspective view of actuator 20, trigger 26, and sensor 28 of WWS 10. FIGS. 2A-2B will be discussed together. As shown, actuator 20 includes body 42 with flat end surface 44 and curvature 46. Actuator 20 also includes output shaft 18 with inner end 48. Trigger 26 is coupled to output shaft 18 of actuator 20, adjacent inner end 48 of output shaft 18. Sensor 28 is coupled to body 42 of actuator 20, adjacent inner end 48 of output shaft 18. Trigger 26 and sensor 28 are coupled to actuator 20 and trigger 26 and sensor 28 together are configured to indicate the position of wiper arm 30 and wiper blade 32 on windshield 12 of aircraft 14, discussed further below.

Trigger 26 is coupled to output shaft 18 of actuator 20, adjacent inner end 48 of output shaft 18. In the embodiment shown, trigger 26 is coupled to output shaft 18 by press-fitting trigger 26 into output shaft 18. In another embodiment, trigger 26 can be coupled to output shaft 18 through a mating threaded connection. In either embodiment, trigger 26 remains coupled to output shaft 18 of actuator 20 and trigger 26 is configured to rotate with output shaft 18 as output shaft 18 rotates in an oscillatory motion. An end of trigger 26 is coupled to output shaft 18 and the opposite end of trigger 26 extends outward from output shaft 18 in a radial direction, remaining free from contact during operation of WWS 10. Trigger 26 is prism shaped such that a height of trigger 26 is greater than a length and width of a cross-section of trigger 26. In the embodiment shown, trigger 26 has a rectangular cross-section, such that trigger 26 is a rectangular prism. In another embodiment, trigger 26 can have a triangular cross-section or a circular cross-section, such that trigger 26 is a triangular prism or a cylinder, respectively. In yet another embodiment, trigger 26 can have a cross-section of any geometric shape, with a height that is greater than a length and width of the cross-sectional edges of trigger 26. Trigger 26 is a magnetic trigger constructed from a magnetic metallic material and trigger 26 is continuously positioned adjacent sensor 28 during rotation of output shaft 18 while operating WWS 10.

Sensor 28 is coupled to body 42 of actuator 20, adjacent inner end 48 of output shaft 18. More specifically, sensor 28 is coupled to flat end surface 44 of body 42 of actuator 20. Sensor 28 is generally flat with an arc shaped profile to conform to curvature 46 of body 42 of actuator 20. In other words, sensor 28 is a flat partial circle sensor coupled to flat end surface 44 with an outer perimeter conforming to curvature 46 of body 42. Sensor 28 is coupled to body 42 of actuator 20 such that sensor 28 remains stationary with respect to output shaft 18 of actuator 20 during operation of WWS 10. Sensor 28 is positioned adjacent trigger 26 and sensor 28 is configured to detect a magnetic field produced by trigger 26. More specifically, sensor 28 is a hall effect sensor configured to detect the magnitude of the magnetic field produced by trigger 26, indicating the position of wiper arm 30 and wiper blade 32 on windshield 12 of aircraft 14, discussed further below.

Housing 40 is generally cylindrical in shape with a closed end on one end and an open end on the other end. Housing 40 includes a center aperture extending through the center of housing 40, sized such that housing 40 can slide over output shaft 18. Housing 40 is positioned adjacent trigger 26 and sensor 28, and housing 40 is configured to seal, cover, and protect trigger 26 and sensor 28 from environmental conditions, such as rain, snow, ice, dirt, etc. Housing 40 can be constructed from a polymer, a metal, a composite material, or a combination of the materials. In one example, housing 40 is constructed from an aluminum alloy using standard manufacturing techniques. Housing 40 is coupled to body 42 of actuator 20 through a standard mechanical connection, such as through fasteners, a threaded connection, or a clamping connection. Housing 40 is coupled to body 42 of actuator 20 during operation of WWS 10. Housing 40 is removable from body 42 of actuator 20, allowing access to trigger 26 and sensor 28 for maintenance, removal, and/or replacement of trigger 26 and/or sensor 28. In the embodiment shown, WWS 10 includes housing 40 to seal, cover, and protect trigger 26 and sensor 28. In another embodiment, WWS 10 may not include housing 40 or housing 40 can be formed integral with body 42 of actuator 20.

In operation, wiper 16 begins in the parked position and remains in the parked position until an operator, such as a pilot or a co-pilot, or an automated system activates WWS 10. As shown in FIG. 1B, wiper 16 is in a parked position when wiper 16 is approximately perpendicular with bottom edge 56 of windshield 12 such that wiper 16 is approximately vertical in orientation. Wiper 16 is in the parked position when wiper 16 is stationary and not currently being used to clear rain or other debris from windshield 12 of aircraft 14. Once WWS 10 is activated, wiper 16 sweeps across windshield 12 toward bottom edge 56 of windshield 12. After wiper 16 reaches its sweep limit near bottom edge 56 of windshield 12, wiper 16 reverses direction and sweeps back in the direction of the parking position. The sweep angle 50 and sweep limits (begin of sweep limit 52 and end of sweep limit 54) of wiper 16 of WWS 10 are coded into the software of controller 24 and that controls how far wiper 16 sweeps in each direction. Further, sensor 28 detects the position of wiper 16 on windshield 12 and ensures wiper 16 reaches the correct sweep limits by adjusting sweep angle 50 as necessary, discussed further below.

In an example, the parking position of wiper 16 can define a reference of 0 degrees. When WWS 10 is activated, wiper 16 moves to begin of sweep limit 52 at approximately 10 degrees and then wiper 16 sweeps across windshield 12 until wiper 16 reaches end of sweep limit 54 at approximately 80 degrees. Wiper 16 then reverses direction and begins sweeping across windshield 12 in the opposite direction toward the begin of sweep limit 52 and the original parking position. The back and forth sweeping motion is continued to clean water or other debris from windshield 12 until WWS 10 is deactivated by the pilot, co-pilot, or an automated system. The angle between begin of sweep limit 52 and end of sweep limit 54 constitutes sweep angle 50 of wiper 16 on windshield 12 of aircraft 14. Sweep angle 50 is a customer driven requirement ensuring a large enough surface area of windshield 12 is cleared of rain or other debris, providing better visibility for the pilot and co-pilot while operating aircraft 14.

In previous windshield wiper systems, sweep angle 50, begin of sweep limit 52, and end of sweep limit 54 are initially coded into controller 24 to control the position of wiper 16, but the initially coded position does not always represent the actual position of wiper 16 on windshield 12. There are many external sources that can alter the actual position of wiper 16 on windshield 12. One example is misalignment of wiper 16 with output shaft 18 of actuator 20, resulting in an incorrect sweep angle 50 when output shaft 18 rotates to the initially coded positions. The misalignment of wiper 16 on output shaft 18 can occur during the manual installation and alignment process used to assemble previous windshield wiper systems. Further, unpredicted forces, such as high winds, flexing of wiper 16, or degradation of components of WWS 10 can cause under-sweep and/or over-sweep (a non-conforming sweep angle 50). In an under-sweep condition, wiper 16 is not reaching its coded sweep limits before reversing direction. Thus, when under-sweep occurs, windshield 12 is not being sufficiently cleared of water or other debris. In an over-sweep condition, wiper 16 is overshooting its coded sweep limits and is travelling beyond the perimeter of windshield 12 and onto the frame surrounding windshield 12. When over-sweep occurs, unpredicted additional loads can be applied to actuator 20 and wiper blade 32 potentially damaging the actuator 20 and wiper blade 32 and shortening the useful lifespan of each component. As such, neither an under-sweep condition nor an over-sweep condition are desirable.

WWS 10 remedies the issue of under-sweep and over-sweep by using sensed data from trigger 26 and sensor 28 to accurately identify the actual location of wiper blade 32 on windshield 12 in real time. If under sweep is occurring, controller 24 instructs output shaft 18 of actuator 20 to continue rotating in a first direction until wiper 16 reaches end of sweep limit 54. Likewise, if under sweep is occurring in the other direction, controller 24 instructs output shaft 18 of actuator 20 to continue rotating in a second direction until wiper 16 reaches begin of sweep limit 52. If over-sweep is occurring, controller 24 instructs output shaft 18 of actuator 20 to stop rotating in the first direction because wiper 16 has already reached end of sweep limit 54. Likewise, if over-sweep is occurring in the other direction, controller 24 instructs output shaft 18 of actuator 20 to stop rotating in the second direction because wiper 16 has already reached begin of sweep limit 52. Thus, WWS 10 ensures that wiper 16 is operating correctly and is achieving the required sweep angle 50 and sweep limits. WWS 10 uses sensed data from trigger 26 and sensor 28 to identify the actual location of wiper 16 on windshield 12 of aircraft 14. Further, WWS 10 automatically adjusts the rotation angle of output shaft 18 of actuator 20 to ensure the correct sweep angle 50 and sweep limits are achieved, conforming to customer requirements.

Traditional windshield wiper systems do not include a magnetic trigger and sensor for constant monitoring of the sweep angle of the wiper. As such, the wiper is configured to sweep to the initially coded limits, but the wiper may not actually sweep to the required sweep limits. WWS 10 is advantageous over traditional wiper systems because WWS 10 utilizes controller 24, actuator 20, trigger 26, and sensor 28 to constantly monitor and control the actual sweep angle 50 of wiper 16, ensuring the required sweep limits are achieved. As discussed, controller 24 is electrically coupled to actuator 20 and controller 24 is configured to control the rotation of output shaft 18. Further, controller 24 is electrically coupled to sensor 28 and controller 24 is configured to receive electrical signals from sensor 28 indicating the magnitude of the magnetic field detected by sensor 28.

Upon activation of WWS 10, wiper 16 moves from the parking position (as previously described) to begin of sweep limit 52. Controller 24 monitors the magnetic field produced by trigger 26 and detected by sensor 28, ensuring wiper 16 begins at the correct parking position and moves to the correct begin of sweep limit 52. Controller 24 ensures the correct positions are achieved through control of the rotation angle of output shaft 18 of actuator 20. Controller 24 initiates movement of wiper 16 by sending a command signal to actuator 20 to control rotation of output shaft 18 and therefore to control sweep angle 50 of wiper 16. Upon activation of actuator 20, wiper 16 begins sweeping across windshield 12 of aircraft 14 in an oscillatory motion, with sensor 28 detecting the magnetic field produced by trigger 26 coupled to the rotating output shaft 18. Trigger 26 is coupled to and rotates with output shaft 18. Thus, trigger 26 is indicative of the position of wiper 16 on windshield 12 of aircraft 14. More specifically, the magnitude of the magnetic field produced by trigger 26 and detected by sensor 28 is directly proportional to sweep angle 50 and the position of wiper arm 30 and wiper blade 32 (coupled to output shaft 18) on windshield 12.

Sensor 28 continuously detects the magnetic field produced by trigger 26 and sensor 28 sends feedback signals to the electrically coupled controller 24, which are received by controller 24 and stored within memory 36 of controller 24. Processor(s) 34 of controller 24 processes the feedback signals received from sensor 28 and outputs data indicative of the position of wiper 16 on windshield 12. More specifically, processor(s) 34 processes the feedback signal indicating the magnitude of the magnetic field detected by sensor 28 and outputs information understandable by a user indicating the position of wiper arm 30 and wiper blade 32 on windshield 12. The output information understandable by a user can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. Upon deactivation of WWS 10, wiper 16 returns to the parking position as previously described. Controller 24 continues to monitor the magnetic field produced by trigger 26 and detected by sensor 28 during the parking process, ensuring wiper 16 returns to the correct parking position through control of the rotation angle of output shaft 18 of actuator 20.

WWS 10 provides many benefits as compared to traditional windshield wiper systems used on aircrafts. WWS 10 includes output shaft 18 with an integrated trigger 26 and controller 24 coupled to sensor 28 for constantly monitoring sweep angle 50 of wiper 16. Integrating trigger 26 and sensor 28 with actuator 20 eliminates the need for manual alignment of wiper 16 with output shaft 18 through the use of expensive test equipment. In contrast, controller 24 processes data received from trigger 26 and sensor 28 and automatically adjusts the rotation angle of output shaft 18 to achieve proper alignment of wiper 16. This saves production time and money because traditional wiper systems require long production time and labor costs to manually align each wiper blade on every wiper system. WWS 10 utilizes trigger 26 and sensor 28 for automatic alignment and parking of wiper 16 during start-up and shutdown of WWS 10. WWS 10 constantly monitors sweep angle 50 of wiper 16 to ensure correct sweep angle 50 is achieved and to detect failures during flight conditions. Further, constant monitoring by WWS 10 acts as a redundant system for computing the speed of actuator 20 in the event of a failure of a speed sensor on actuator 20. WWS 10 can be implemented on an existing aircraft with only minor changes to the existing system (installing trigger 26 and sensor 28 on actuator 20). Due to the elimination of the dependency on manual labor and expensive test equipment required for wiper alignment, the cost of WWS 10 is less than installation of traditional windshield wiper systems. WWS 10 provides a more reliable wiper system as it constantly monitors sweep angle 50 and sweep limits 52/54 of wiper 16 during operation of WWS 10. Further, the data captured by trigger 26 and sensor 28 can be provided to the customer as objective evidence for conforming sweep angle 50, sweep area, and sweep limits 52/54.

WWS 10 improves the accuracy and performance of the overall wiper system on aircraft 14. Any deviation in the position of wiper 16 due to external forces or misalignment of components (which cannot be sensed by the software in controller 24) will be detected by trigger 26 and sensor 28, then controller 24 will adjust sweep angle 50 accordingly to remedy the issue. WWS 10 is an intelligent closed loop system used to control sweep angle 50 and sweep limits 52/54 of wiper 16 in an efficient and simple solution. WWS 10 is a simple solution that meets customer requirements and controls the angular position of output shaft 18 and wiper 16 to extend the lifespan of wiper 16 by preventing unexpected forces and loads on wiper 16 due to over-shoot condition, ultimately resulting in cost savings to the customer. WWS 10 provides many benefits over previous aircraft windshield wiper systems that will be appreciated by those skilled in the art.

Discussion of Possible Embodiments

The following are non-exclusive descriptions of possible embodiments of the present invention.

A windshield wiper system for use on a windshield of an aircraft, the windshield wiper system comprising: a wiper comprising a wiper arm and a wiper blade coupled to a first end of the wiper arm; an actuator comprising a body and an output shaft, wherein the output shaft is coupled to a second end of the wiper arm, and wherein the actuator is configured to rotate the output shaft to sweep the wiper arm and wiper blade in an arc across the windshield of the aircraft; a trigger coupled to the output shaft of the actuator, wherein the trigger is configured to rotate with the output shaft; and a sensor coupled to the body of the actuator, wherein the sensor is configured to detect a magnetic field produced by the trigger.

The windshield wiper system of the preceding paragraph can optionally include, additionally and/or alternatively, any one or more of the following features, configurations and/or additional components:

A controller electrically coupled to the actuator and electrically coupled to the sensor; and a gear reduction coupled to and positioned between the output shaft and the actuator.

The controller is configured to: send electrical signals to and receive electrical signals from the actuator to control rotation of the output shaft of the actuator; and receive electrical signals from the sensor indicating the magnitude of the magnetic field detected by the sensor.

The gear reduction is integral with the actuator such that the actuator, gear reduction, and output shaft are a single assembly.

The trigger is a magnetic trigger constructed from a metallic material.

The trigger is press-fit into the output shaft of the actuator and extends outward from the output shaft in a radial direction, and wherein the trigger is prism shaped such that a height of the trigger is greater than a length and width of a cross-section of the trigger.

The sensor is a hall effect sensor configured to detect the magnitude of a magnetic field.

The sensor is coupled to a flat end surface of the body of the actuator and the sensor is arc shaped to conform to a curvature of the body of the actuator, and wherein the sensor is stationary with respect to the output shaft of the actuator.

The trigger and the sensor are positioned adjacent an inner end of the output shaft, and wherein the trigger is continuously positioned adjacent the sensor.

The magnetic field produced by the trigger and detected by the sensor indicates the position of the wiper arm and wiper blade on the windshield of the aircraft.

A housing positioned adjacent the trigger and positioned adjacent the sensor, wherein the housing is configured to cover and protect the trigger and the sensor from environmental conditions.

A method of operating a windshield wiper system for use on a windshield of an aircraft, the method comprising: transferring, by a controller, a command signal to an electrically coupled actuator to control rotation of an output shaft of the actuator; rotating, by the actuator, the output shaft in an oscillatory motion; detecting, by a sensor, a magnetic field produced by a trigger coupled to the rotating output shaft; and transferring, by the sensor, a feedback signal to the electrically coupled controller indicating the magnitude of the magnetic field detected by the sensor; wherein the magnitude of the magnetic field is indicative of a position of a wiper arm and a wiper blade coupled to the output shaft.

The method of the preceding paragraph can optionally include, additionally and/or alternatively, any one or more of the following features, configurations and/or additional components:

Receiving, by the controller, the feedback signal transferred from the sensor; storing, by the controller, the feedback signal within a memory of the controller; processing, by a processor of the controller, the stored feedback signal; transferring, by the controller, a communication signal indicating the results of the processed feedback signal.

The results of the processed feedback signal include one or more of a sweep angle performed by the wiper arm and the wiper blade, a parking position of the wiper arm and the wiper blade, and a rotational speed of the output shaft of the actuator.

Adjusting, by the controller, the sweep angle of the wiper arm and the wiper blade upon determining the sweep angle of the wiper arm and the wiper blade is not within predefined sweep angle limits; wherein the controller adjusts the sweep angle of the wiper arm and the wiper blade by adjusting the rotational limits of the output shaft of the actuator.

Adjusting, by the controller, the parking position of the wiper arm and the wiper blade upon determining the parking position of the wiper arm and the wiper blade is not at a predefined zero-degree parking position; wherein the controller adjusts the parking position of the wiper arm and the wiper blade by rotating the output shaft of the actuator until the predefined zero-degree parking position is reached by the wiper arm and the wiper blade.

The trigger: is a magnetic trigger constructed from a metallic material; is press-fit into the output shaft of the actuator and extends outward from the output shaft in a radial direction; is prism shaped such that a height of the trigger is greater than a length and width of a cross-section of the trigger; is positioned adjacent an inner end of the output shaft of the actuator; and is continuously positioned adjacent the sensor during operation of the windshield wiper system.

The sensor: is a hall effect sensor configured to detect the magnitude of a magnetic field; is coupled to a flat end surface of a body of the actuator and the sensor is arc shaped to conform to a curvature of the body of the actuator; is stationary with respect to the output shaft of the actuator; and is positioned adjacent an inner end of the output shaft of the actuator.

The windshield wiper system further comprises a housing positioned adjacent the trigger and positioned adjacent the sensor, wherein the housing is configured to cover and protect the trigger and the sensor from environmental conditions.

The wiper blade is coupled to a first end of the wiper arm; the output shaft of the actuator is coupled to a second end of the wiper arm; the actuator is configured to rotate the output shaft to sweep the wiper arm and the wiper blade in an arc across the windshield of the aircraft; the trigger is configured to rotate with the output shaft; and the sensor is coupled to a body of the actuator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for use on a windshield of an aircraft, the windshield wiper system comprising:
   a wiper comprising a wiper arm and a wiper blade coupled to a first end of the wiper arm;
   an actuator comprising a body and an output shaft, wherein the output shaft is coupled to a second end of the wiper arm, and wherein the actuator is configured to rotate the output shaft to sweep the wiper arm and wiper blade in an arc across the windshield of the aircraft;
   a gear reduction coupled to and positioned between the output shaft and the actuator;
   a trigger coupled to the output shaft of the actuator, wherein the trigger is configured to rotate with the output shaft;
   a sensor coupled to the body of the actuator, wherein the sensor is configured to detect a magnetic field produced by the trigger; and
   a controller electrically coupled to the actuator and electrically coupled to the sensor,
   wherein the controller is configured to:
   send electrical signals to and receive electrical signals from the actuator to control rotation of the output shaft of the actuator; and
   receive electrical signals from the sensor indicating a magnitude of the magnetic field detected by the sensor
   wherein the controller is further configured to:
   determine, based on electrical signals from the sensor, if under sweep is occurring with the output shaft rotating in a first direction and if the controller determines under sweep is occurring with the output shaft rotating in the first direction to instruct the actuator to continue rotating the output shaft in the first direction until the wiper reaches a pre-determined end of sweep limit;
   determine, based on electrical signals from the sensor, whether under sweep is occurring with the output shaft rotating in a second direction and if the controller determines under sweep is occurring with the output shaft rotating in the second direction to instruct the actuator to continue rotating the output shaft in the second direction until the wiper reaches a pre-determined begin of sweep limit;

determine, based on electrical signals from the sensor, whether over sweep is occurring with the output shaft rotating in the first direction and if the controller determines over sweep is occurring with the output shaft rotating in the first direction to instruct the actuator to stop rotating the output shaft in the first direction when the wiper reaches the pre-determined end of sweep limit;

determine, based on electrical signals from the sensor, whether over sweep is occurring with the output shaft rotating in the second direction and if the controller determines over sweep is occurring with the output shaft rotating in the second direction to instruct the actuator to stop rotating the output shaft in the second direction when the wiper reaches the pre-determined begin of sweep limit;

wherein the controller is further configured to output user-understandable information indicating the position of the wiper arm and the wiper blade on the windshield.

2. The windshield wiper system of claim 1, wherein the gear reduction is integral with the actuator such that the actuator, gear reduction, and output shaft are a single assembly.

3. The windshield wiper system of claim 1, wherein the trigger is a magnetic trigger constructed from a metallic material.

4. The windshield wiper system of claim 1, wherein the trigger is press-fit into the output shaft of the actuator and extends outward from the output shaft in a radial direction, and wherein the trigger is prism shaped such that a height of the trigger is greater than a length and width of a cross-section of the trigger.

5. The windshield wiper system of claim 1, wherein the sensor is a hall effect sensor configured to detect a magnitude of a magnetic field.

6. The windshield wiper system of claim 1, wherein the sensor is coupled to a flat end surface of the body of the actuator and the sensor is arc shaped to conform to a curvature of the body of the actuator, and wherein the sensor is stationary with respect to the output shaft of the actuator.

7. The windshield wiper system of claim 1, wherein the trigger and the sensor are positioned adjacent an inner end of the output shaft, and wherein the trigger is continuously positioned adjacent the sensor.

8. The windshield wiper system of claim 1, wherein the magnetic field produced by the trigger and detected by the sensor indicates a position of the wiper arm and wiper blade on the windshield of the aircraft.

9. The windshield wiper system of claim 1 and further comprising a housing positioned adjacent the trigger and positioned adjacent the sensor, wherein the housing is configured to cover and protect the trigger and the sensor from environmental conditions.

10. A method of operating a windshield wiper system for use on a windshield of an aircraft, the method comprising:
transferring, by a controller, a command signal to an electrically coupled actuator to control rotation of an output shaft of the actuator;
rotating, by the actuator, the output shaft in an oscillatory motion;
detecting, by a sensor, a magnetic field produced by a trigger coupled to the rotating output shaft; and
transferring, by the sensor, a feedback signal to the electrically coupled controller indicating a magnitude of the magnetic field detected by the sensor;
wherein the magnitude of the magnetic field is indicative of a position of a wiper arm and a wiper blade coupled to the output shaft;
receiving, by the controller, the feedback signal transferred from the sensor;
storing, by the controller, the feedback signal within a memory of the controller;
processing, by a processor of the controller, the stored feedback signal; and
transferring, by the controller, a user-understandable communication signal indicating the results of the processed feedback signal;
further comprising:
determining, by the controller based the feedback signal transferred from the sensor, if under sweep is occurring with the output shaft rotating in a first direction and if the controller determines under sweep is occurring with the output shaft rotating in the first direction instructing the actuator to continue rotating the output shaft in the first direction until the wiper reaches a pre-determined end of sweep limit;
determining, by the controller based the feedback signal transferred from the sensor, whether under sweep is occurring with the output shaft rotating in a second direction and if the controller determines under sweep is occurring with the output shaft rotating in the second direction instructing the actuator to continue rotating the output shaft in the second direction until the wiper reaches a pre-determined begin of sweep limit;
determining, by the controller based the feedback signal transferred from the sensor, whether over sweep is occurring with the output shaft rotating in the first direction and if the controller determines over sweep is occurring with the output shaft rotating in the first direction instructing the actuator to stop rotating the output shaft in the first direction when the wiper reaches the pre-determined end of sweep limit;
determining, by the controller based the feedback signal transferred from the sensor, whether over sweep is occurring with the output shaft rotating in the second direction and if the controller determines over sweep is occurring with the output shaft rotating in the second direction instructing the actuator to stop rotating the output shaft in the second direction when the wiper reaches the pre-determined begin of sweep limit.

11. The method of claim 10, wherein the results of the processed feedback signal include one or more of a sweep angle performed by the wiper arm and the wiper blade, a parking position of the wiper arm and the wiper blade, and a rotational speed of the output shaft of the actuator.

12. The method of claim 11 and further comprising:
adjusting, by the controller, the sweep angle of the wiper arm and the wiper blade upon determining the sweep angle of the wiper arm and the wiper blade is not within predefined sweep angle limits;
wherein the controller adjusts the sweep angle of the wiper arm and the wiper blade by adjusting the rotational limits of the output shaft of the actuator.

13. The method of claim 11 and further comprising:
adjusting, by the controller, the parking position of the wiper arm and the wiper blade upon determining the parking position of the wiper arm and the wiper blade is not at a predefined zero-degree parking position;
wherein the controller adjusts the parking position of the wiper arm and the wiper blade by rotating the output shaft of the actuator until the predefined zero-degree parking position is reached by the wiper arm and the wiper blade.

14. The method of claim 10, wherein the trigger:
is a magnetic trigger constructed from a metallic material;
is press-fit into the output shaft of the actuator and extends outward from the output shaft in a radial direction;
is prism shaped such that a height of the trigger is greater than a length and width of a cross-section of the trigger;
is positioned adjacent an inner end of the output shaft of the actuator; and
is continuously positioned adjacent the sensor during operation of the windshield wiper system.

15. The method of claim 10, wherein the sensor:
is a hall effect sensor configured to detect the magnitude of a magnetic field;
is coupled to a flat end surface of a body of the actuator and the sensor is arc shaped to conform to a curvature of the body of the actuator;
is stationary with respect to the output shaft of the actuator; and
is positioned adjacent an inner end of the output shaft of the actuator.

16. The method of claim 10, wherein the windshield wiper system further comprises a housing positioned adjacent the trigger and positioned adjacent the sensor, wherein the housing is configured to cover and protect the trigger and the sensor from environmental conditions.

17. The method of claim 10, wherein:
the wiper blade is coupled to a first end of the wiper arm;
the output shaft of the actuator is coupled to a second end of the wiper arm;
the actuator is configured to rotate the output shaft to sweep the wiper arm and the wiper blade in an arc across the windshield of the aircraft;
the trigger is configured to rotate with the output shaft; and
the sensor is coupled to a body of the actuator.

* * * * *